United States Patent [19]

Pease

[11] Patent Number: 5,029,975
[45] Date of Patent: Jul. 9, 1991

[54] DESPECKLING SCREEN UTILIZING OPTICAL FIBERS AND METHOD OF REDUCING INTERFERENCE USING SAME

[75] Inventor: Richard W. Pease, Omaha, Nebr.

[73] Assignee: The Mitre Corporation, Bedford, Mass.

[21] Appl. No.: 469,284

[22] Filed: Jan. 24, 1990

[51] Int. Cl.[5] .......................... G02B 6/08; F21V 7/04; G03B 21/00
[52] U.S. Cl. ......................... 350/96.27; 350/96.10; 350/96.25; 350/320; 362/32; 362/259; 353/121
[58] Field of Search ............... 350/96.10, 96.24, 96.25, 350/96.26, 96.27, 96.28, 96.29, 320; 358/901; 353/39, 121; 362/32, 259; 372/29

[56] References Cited

U.S. PATENT DOCUMENTS

| | | | |
|---|---|---|---|
| H,542 | 11/1988 | Werkheiser, Jr. | 350/96.25 |
| 3,753,607 | 8/1973 | Kitano et al. | 350/96.25 |
| 4,113,348 | 9/1978 | Yevick | 350/96.25 |
| 4,650,279 | 3/1987 | Magee | 350/96.24 |
| 4,744,615 | 5/1988 | Fan et al. | 350/96.10 |
| 4,904,049 | 2/1990 | Hegg | 350/96.27 |
| 4,932,752 | 6/1990 | Krashkevich et al. | 350/96.34 |
| 4,973,128 | 11/1990 | Hodges | 350/96.27 X |
| 4,978,195 | 12/1990 | Takano et al. | 350/96.27 |

*Primary Examiner*—Brian Healy
*Attorney, Agent, or Firm*—Wolf, Greenfield & Sacks

[57] ABSTRACT

The invention comprises a method and apparatus for decohering coherent light projected onto a screen by transmitting the coherent light through a series of light conducting optical fibers, preferably of varying length.

13 Claims, 1 Drawing Sheet

DESPECKLING SCREEN UTILIZING OPTICAL FIBERS AND METHOD OF REDUCING INTERFERENCE USING SAME

FIELD OF INVENTION

This invention relates to laser projection and in particular to large screen rear projection laser systems. The invention is embodied in an apparatus and method for altering the coherent properties of a laser light upon its diffusion onto a screen.

Depending on the direction from which a laser beam is projected onto a screen, the system is described as being either "front" or "rear". A front projection system projects the beam over the audience onto the front or audience side of the screen. A rear projection system projects the beam from behind the screen onto the non audience side of the screen.

There are a number of large screen laser projection devices in existence which operate by mechanically scanning colored beams of modulated laser light across and down a large rectangular surface producing an image that is similar to television or computer graphics It is well known from wave propagation theory that two wave sources that are in phase or a single wave source in which the phase differential that is constant in time produce an interference pattern. Such sources are referred to as coherent sources. A laser is a coherent source of light in which the wave components of the beam have a constant phase differential. When laser light is projected onto a screen for viewing, the waves reinforce and cancel each other thereby forming an interference pattern. To the viewer, this interference pattern appears as dark areas surrounded by many bright points of light, an effect known as "speckle". The resulting images appear as if they are projected onto a heavily beaded screen. The speckle effect is more pronounced in bright lasers. The actual points of light seem to be formed at the retina of the eye and not on the screen. Although the effect is perceived differently by different viewers, most viewers agree it is disturbing.

The elimination of speckle in front projection laser systems is currently accomplished by shaking the screen at a frequency of 40Hz or more. This shaking method does not actually prevent the reinforcement and interference of the coherent light waves at the screen surface, but only moves the resulting interference pattern rapidly enough so that it is unperceived by the human eye. This shaking method is not practical for large screen rear projection laser systems due to the typically larger size of the screen and the direction from which the beam is projected onto the screen.

Because the use of laser projectors is relatively new, particularly in large screen rear projection laser systems, little practical work has been done to eliminate the speckle problem.

It is therefore an object of the present invention to provide a screen for use in large screen rear projection laser systems that eliminates the problem of speckle caused by the projection of laser light onto such a screen.

It is a further object of the present invention to provide a method for simply and economically eliminating the problem of speckle and interference patterns in large screen rear projection laser systems.

It is a further object of the current invention to provide a simple and economical method of reducing the phase differential of light waves emitted from a laser beam.

SUMMARY OF INVENTION

According to the present invention, a despeckling screen is provided for altering the coherent properties of light emitted from a laser projector. The screen is comprised of a multiplicity of optical fibers optically connected to a substrate base.

The optical fibers of the present invention conduct light by total internal reflection. A proper fiber length to width ratio is an essential characteristic of the present invention, insuring an adequate number of internal reflections during the transmission of light through the fiber to decohere the light. In the preferred embodiment, the fiber length to width ratio should be greater than 40:1.

A second essential characteristic of the present invention is to vary the lengths of optical fibers randomly within a specified range thereby providing a multiplicity of varying length optical paths through which the coherent light is transmitted.

A third essential component of the present invention is the positioning of the optical fibers in relationship to one another. In the preferred embodiment, a large number of optical fibers, on the order of millions, are positioned adjacent to and parallel with one another forming a massive fiber bundle or array. Because the optical fibers are positioned parallel to one another in the fiber array, laser light which is scanned across the array surface enters each optical fiber at a slightly different angle causing the angle of reflection, number of internal reflections and overall optical conduction path to vary from fiber to fiber.

Coherent light entering different fibers at differing angles, and the waves reflecting off of the interior walls of the fiber introduces phase differences among the waves due to differing conduction paths through the fiber array. This effect is enhanced when the fiber lengths themselves vary randomly further introducing phase differences from fiber to fiber. As an overall result, coherent light dispersed onto one end of the optical fiber array appears on the opposite end in a decoherent manner due to the phase differences introduced in the multitude of different optical paths within the fibers themselves and throughout the fiber.

Because of the need to mechanically support the fiber array and maintain the fibers in a fixed relationship with one another, a transparent substrate base is optically coupled to the fiber array. One end of each fiber is positioned directly perpendicular to the surface of the substrate, while the opposite end is exposed to the viewing audience. In the preferred embodiment, the substrate defines the dimensions of the screen and is made of a thin transparent material which will minimize the net loss of optical energy of the light dispersed onto the substrate surface.

Laser light projected onto the substrate surface of a despeckling screen constructed according to the preferred embodiment appears on the opposite side of the screen free of speckle or interference patterns.

DETAILED DESCRIPTION OF THE INVENTION

Figure 1:
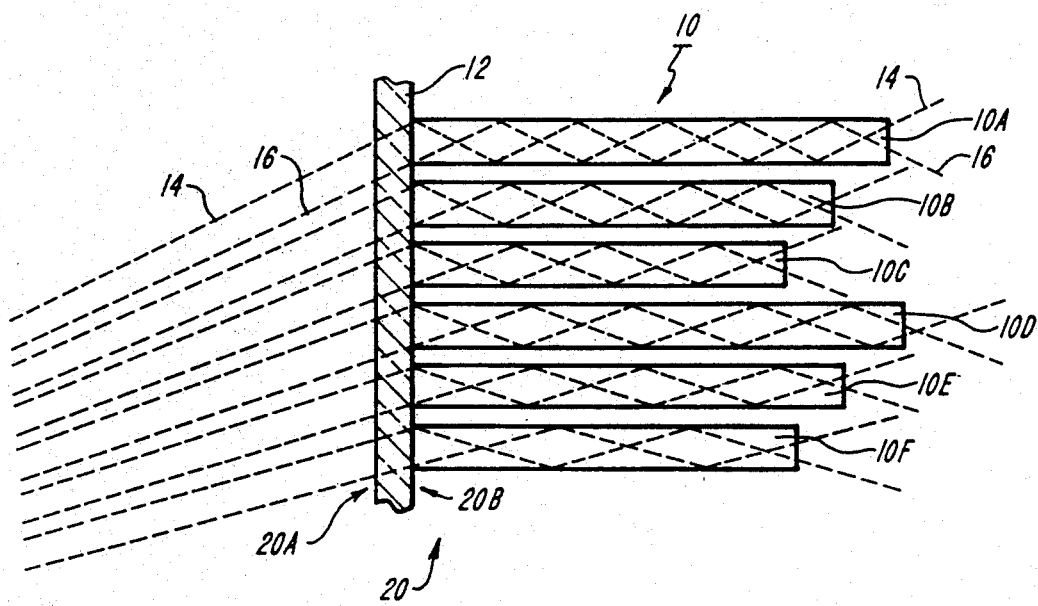
FIG. 1 is a side view of a clear fiber illustrating the paths which light waves will take when transmitted through the fiber.

Referring to the drawings, FIG. 1 shows an enlarged cross-section segment of despeckling screen 20 which is comprised of substrate 12 optically coupled to fiber array 10. FIG. 1 further illustrates the internal reflections and optical paths of coherent light beams 14 and 16 through fibers 10A-F.

In the preferred embodiment of the present invention, optical fibers 10A-F are of a conventional step-index design in which light is transmitted through the fiber interior by internal reflections. When coherent light beams 14 and 16 enter fibers 10A-F, the beam wave trains collide with the interior walls of the fiber and reflect back into the fiber interior in a ricocheting manner. Due to these internal reflections, light has many different optical paths through each fiber interior, each path having a different number of reflections and length. Because of the differing path lengths of light waves within the fiber, phase differences are introduced among the coherent waves. These phase differences cause reinforcement and cancellation of the light waves within the fiber interior resulting in decoherences of the light transmitted through the fiber.

When the lengths of fiber 10A-F are much greater than the fiber widths, i.e. the diameters, there is enough disparity between the various optical path lengths throughout the fiber to cause decoherence. In the preferred embodiment of the present invention, the fiber length to width ratio is greater than 40:1.

The fiber width will also affect the clarity and resolution with which the viewer sees the projected laser image. For laser projection applications having a minimum resolvable spot size of 1 mm square a fiber diameter of less than 0.1 mm is preferred.

The ends of optical fibers 10A-F should be neither too optically smooth or rough. Some dispersion of light upon entering the fiber is desirable to create different optical paths throughout the fiber interior. Also, some diffusion of light upon exiting the fiber is desirable so that the light emitted from the fiber is visible to a majority of the audience. If the fiber ends are optically smooth or near perfect, the disparity among light paths within the fiber will not be adequate to decohere the transmitted light, and upon exiting the fiber, the emitted light will be visible only to those viewers looking directly into the fiber end. On the other hand, very rough surfaces at the input fiber ends will cause reflection of light emitted from the projector backward towards the projector preventing transmission of that light through the fiber. At the output fiber end, rough surfaces will cause reflections of the ambient light from the viewing environment back towards the audience causing a reduction in the contrast of the transmitted light.

A second element of the present invention relates to the lengths of the optical fibers. The decohering effect of the optical fibers is further enhanced when the fiber lengths vary randomly within a specified range further ensuring differing optical path lengths from fiber to fiber. In the preferred embodiment, the lengths of all optical fibers should vary randomly within a range of not more than 15%. If the lengths of the optical fibers 10A-F are all equivalent, the interference patterns may not be completely eliminated. If the lengths of the optical fibers 10A-F vary too greatly, the screen surface viewed by the audience will appear to be uneven resulting in Jagged images. In the preferred embodiment, an average fiber length of between 5 mm and 1 mm is recommended. An average fiber length of greater than 10 mm may cause weight, maintenance and transmission problems.

A third element of the present invention relates to the actual positioning of the fibers. In the preferred embodiment of the present invention, the optical fibers are arranged adjacent to and parallel with one another so as to form a massive fiber bundle or array which completely cover the screen surface. Because the fibers are arranged parallel to one another, modulated beams of laser light which are scanned down and across the screen surface enter individual fibers at differing angles thereby further contributing to the difference in the number of internal reflections and optical path lengths within the fiber interior. The greatest variety of incident angles of dispersion is achieved when the distance from the coherent light source is large in comparison to the average fiber length, as is preferred in projection systems utilizing the present invention.

FIG. 1 illustrates the essential element of the present invention. FIG. 1 illustrates these three essential elements outlined above namely the fiber length to width ratio, the randomly varying lengths of fibers 10A-F and the adjacent and parallel positioning of fibers 10A-F. The combination of these three elements in conjunction with the inherent decohering property of optical fibers, results in the decoherence of the light at the screen surface and the elimination of speckle patterns.

Figure 2:
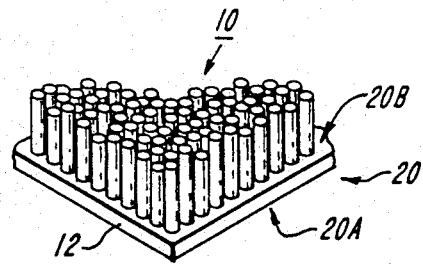
FIG. 2 is an enlarged fragmented view of the despeckling screen showing the fiber bundle attached to the substrate.

Substrate 12 serves to provide mechanical support for the fiber array 10. As illustrated in FIGS. 1 and 2. fibers 10A-F are positioned perpendicular to and directly against the surface of substrate 12. In this manner, optical fibers 10A-F are optically coupled with substrate 12 whereby the light transmitted through the substrate 12 is subsequently transmitted through fibers 10A-F. In the preferred embodiment of the present invention, the substrate 12 is made of a thin transparent material such as plexiglass. The dimensions of substrate 12 define the dimensions of the speckling screen 20. A screen (and substrate) size 20'×30' is preferred. Also in the preferred embodiment, the optical fibers are positioned perpendicularly to the surface of substrate 12 and are held in place by a peripheral gripping arrangement shown schematically as 24 in FIG. 3 generally coincident with the perimeter of the despeckling screen 20. This gripping arrangement can be a simple edge support, or it may be an elastic support band. Alternately, the fibers may be glued to each other. If necessary, although not recommended, the fiber ends also may be glued to substrate 12. Note however, the only function of substrate 12 is to provide mechanical support for fiber array 10. Should a method be developed in which the fibers can be maintained in a rigid parallel manner substrate 12 can be eliminated completely.

Figure 3:
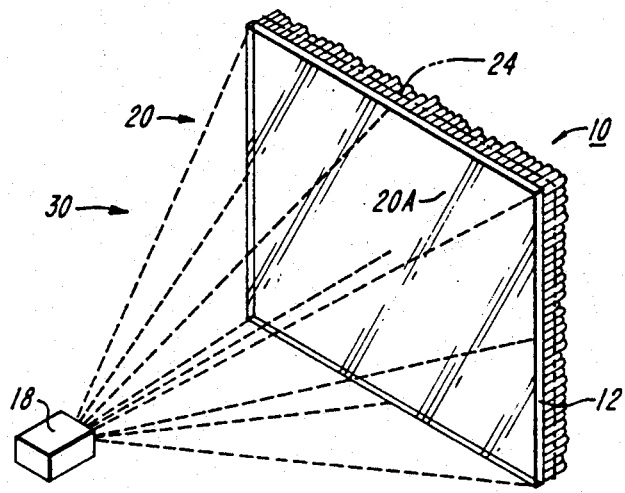
FIG. 3 is a system drawing of a large screen rear projection laser system showing a despeckling screen in conjunction with other system components.

FIG. 3 illustrates despeckling screen 20 of the present invention in conjunction with other elements of a rear projection laser system 30. In the preferred application, the screen surface 20A faces laser projector 18. A reverse positioning of the despeckling screen 20 so that the surface 20A faces audience 22 and surface 20B faces the laser projector 18 is also possible, however, reflections of ambient light from the audience viewing environment on surface 20A may cause a reduction in the contrast of the transmitted images causing the screen images to be difficult to see.

Conventional manufacturing processes ca be used to obtain the preferred design of the optical fibers described herein as well as texturing the fiber ends and physically positioning the fibers onto the substrate surface.

While the present invention has been shown and described above with respect to the preferred embodiment, it will be apparent that the foregoing and other changes of form and detail may be made therein by one skilled in the art without departing from the true spirit and scope of the invention.

What is claimed is:

1. Means for altering the coherent properties of light emitted from a laser along a first direction comprising;
   a multiplicity of light conducting, optical fibers arranged in a mutually parallel array with said fibers oriented to receive light at a first end from said laser and to emit light conducted by said fibers from a second end,
   said fibers having a high fiber length to fiber width ratio and lengths that vary, thereby inducing phase differences between the light emitted from the said second ends of different ones of said fibers thereby avoiding the creation of interference patterns.

2. The apparatus of claim 1 wherein said first ends of said fibers are positioned perpendicular to and directly against the surface of a light transmitting substrate oriented generally traverse to said first direction.

3. The apparatus of claim 1 wherein said fiber length to fiber width ratio is at least 40:1.

4. The apparatus of claim 1 wherein said fibers have a diameter of less than 0.1 mm.

5. The apparatus of claim 1 wherein the length of said fibers ranges from 5 mm. to 10 mm.

6. The apparatus of claim 1 wherein the length of said fibers varies randomly within a range not more than 15%.

7. The apparatus of claim 1 wherein said fibers are made of plastic.

8. The apparatus of claim 1 wherein the ends of said fibers are neither optically smooth nor not optically rough, thereby allowing moderate dispersion of light as it enters said first end of said fibers and moderate diffusion of light as it exits said second end of said fibers.

9. The apparatus of claim 2 wherein said substrate is comprised of a transparent material having flat surfaces.

10. The apparatus of claim 9 wherein said substrate means is made of plexiglass.

11. A method of reducing interference or speckle patterns caused by the diffusion of coherent light onto a screen by altering the coherent properties of said light at the screen surface, said method comprising the steps of transmitting said coherent light through a multiplicity of light conducting optical fibers, said fibers lying adjacent to and parallel with each other, having a high length to width ratio, and having lengths that vary.

12. The method of claim 11 wherein prior to transmitting said coherent light through said multiplicity of light conducting optical fibers, said coherent light is dispersed on a piece of transparent substrate which is optically coupled to said multiplicity of optical fibers.

13. A method of reducing interference or speckle patterns caused by the diffusion of coherent light onto a screen by altering the coherent properties of said light at the screen surface, said method comprising the steps of
   projecting said coherent light onto a piece of transparent substrate, and
   transmitting said coherent light through a multiplicity of light-conducting optical fibers, said fibers lying adjacent to and parallel with one another optically coupled to said transparent substrate, having a high length to width ratio, and having lengths that vary.

* * * * *